Feb. 27, 1951  F. H. OWENS  2,543,125
PROJECTION MACHINE FILM DRIVE AND REWINDING MECHANISM
Filed May 19, 1944  2 Sheets-Sheet 2
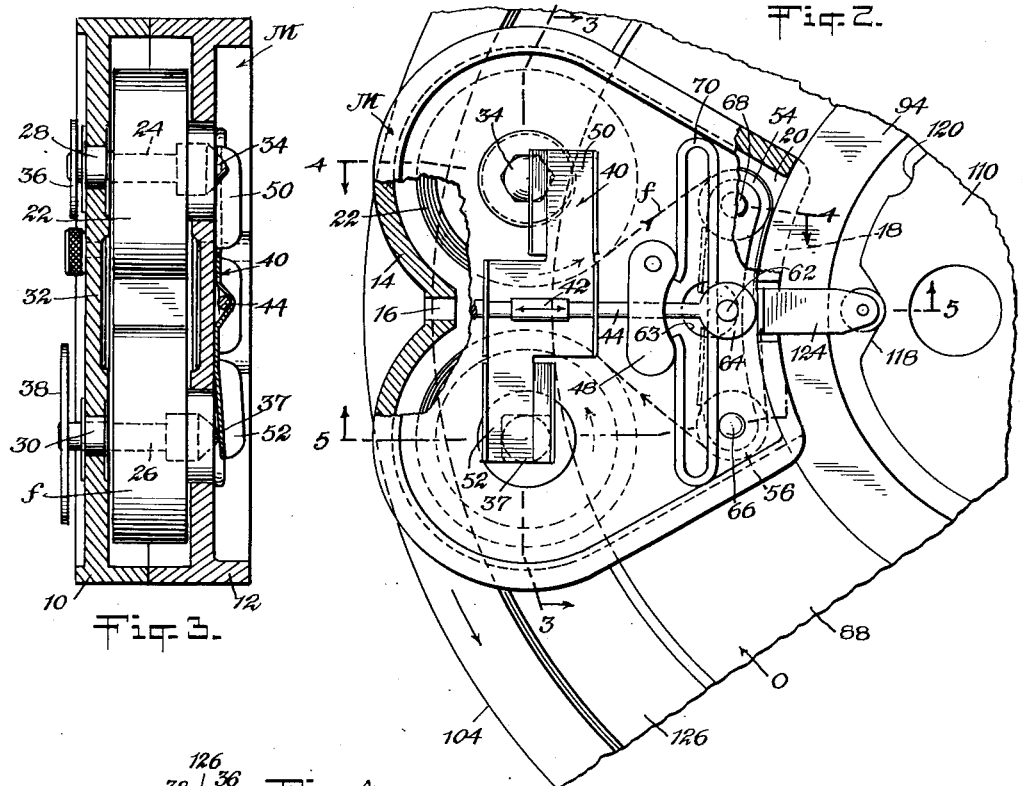
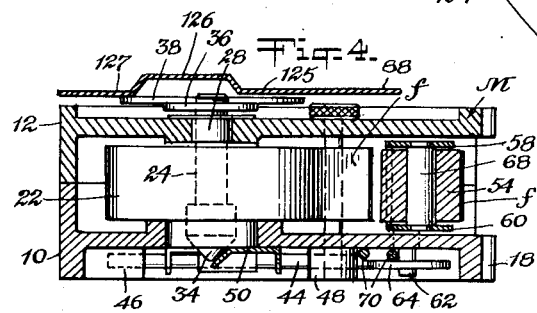
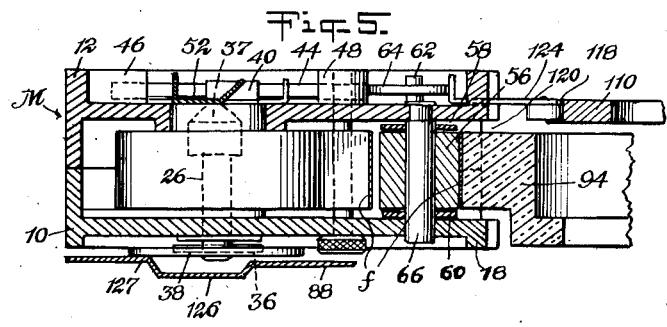
INVENTOR.
Freeman H. Owens
BY
James H. Franklin
Attorneys Patented Feb. 27, 1951

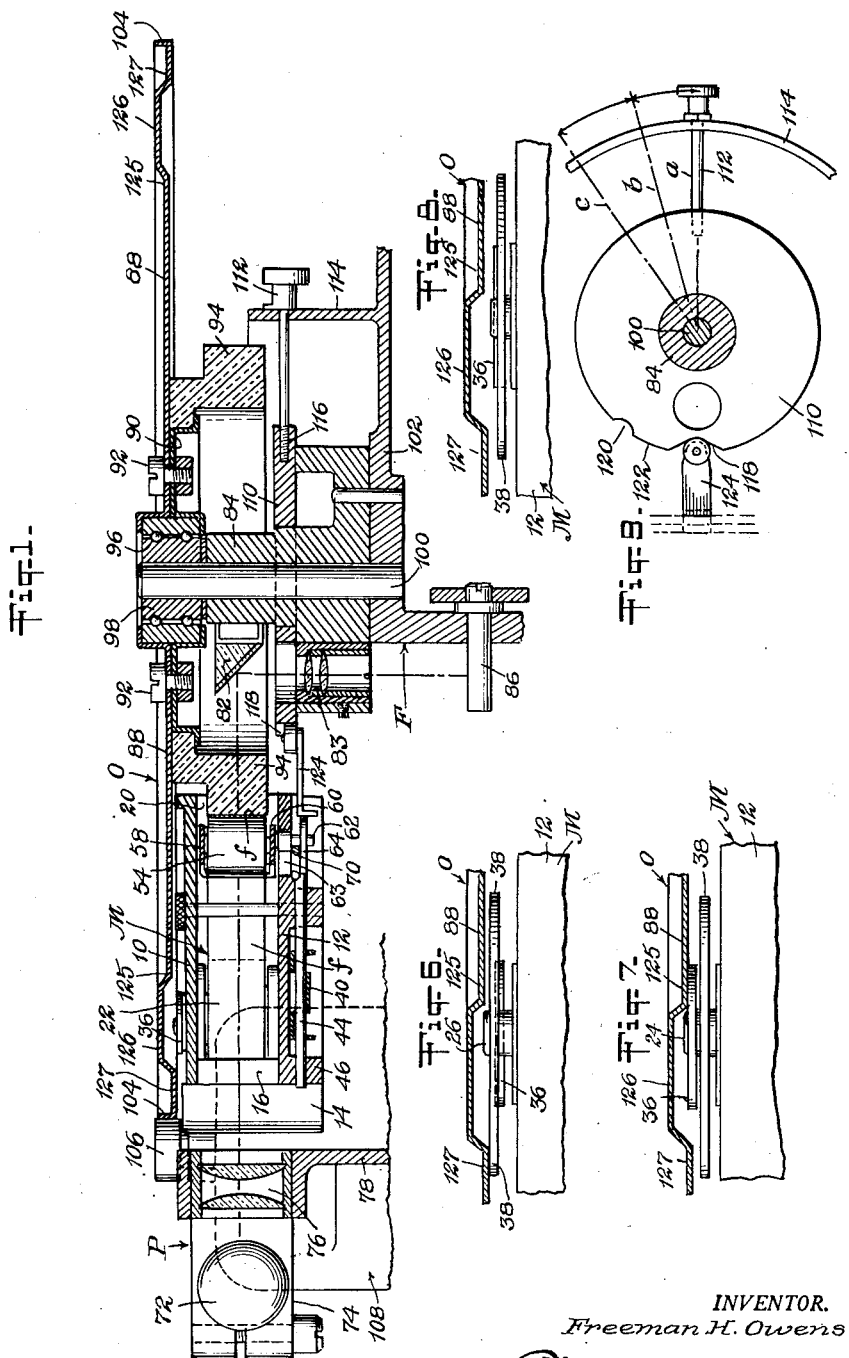

2,543,125

UNITED STATES PATENT OFFICE 2,543,125

PROJECTION MACHINE FILM DRIVE AND REWINDING MECHANISM

Freeman H. Owens, New York, N. Y.

Application May 19, 1944, Serial No. 536,346

29 Claims. (Cl. 242—55)

This invention relates to a film projection machine and more particularly to a film projection machine for the reproduction of sound.

The broad object of my present invention centers about the provision of an improved automatic sound reproducing machine. In such a machine it is intended that any one of a large number of phonograph records may be selected by an operator or user by his dropping a coin into the machine and determining the desired selection. The phonograph records are produced on and reproduced in the machine from a photographic record of film. One or more such records may be carried on a single reel of film which film is housed and contained in a film magazine removably mountable in the machine. From a plurality of such film magazines placed in the machine, any one film record may be selected by the operator for reproduction. Reproduction is effected by optical projection of the photographic-phonograph record on the film. When the operator has indicated his desired selection, the machine automatically operates to move the film magazine into projection position for a projection run and to feed and wind the film in the magazine during a projection run, the film in the magazine being thereafter automatically rewound after a projection run.

In my copending application Serial No. 536,344, filed May 19, 1944, now Patent No. 2,539,521, dated January 30, 1951, I disclose the general organization of the operated mechanism of this film projection machine. In the present application, I disclose the film drive and rewinding mechanism employed after a selected record is moved into projection position for feeding and winding the film in the magazine for the projection run and for then rewinding the film in the magazine after a projection run. To avoid unduly complicating the disclosure in the present application, it may be assumed that a selected record has been moved to a projection position and, therefore, the film magazine although actually movable into and out of projection position, may here be assumed to be a fixed film magazine. It will also be understood that although the film in the magazine may contain a plurality such, for example, as four different phonograph records arranged parallelly longitudinally of the film in which any one of the four records may be selected by suitable shuttering devices, it will be assumed for the same indicated purpose that the film contains but a single record. It will be further understood that although this film drive and rewinding mechanism of the present invention is explained by reference to the reproduction of sound on film, that the same mechanism is intended for employment with the optical reproduction of any photographic data on film.

The prime desiderata of the invention described in this application centers about the provision of a novel and unique film drive and rewinding mechanism for an optical projection machine. This mechanism is characterized broadly by a novelty in organization and combination which enables the making of an automatic sound reproducer of exceedingly simple construction compared to the many functions and advantages attained, a construction which may be housed in very small confines so that the reproducer as a whole may be hung, for example, on the wall of the restaurant or inn, one for each separate table booth, and a construction which is characterized by ease of operation, facility in assembly and repair, and durability in use.

To the accomplishment of these objects and such other objects as may hereinafter appear, my invention relates to the film drive and rewinding mechanism as sought to be defined in the appended claims and as described in the accompanying specification taken together with the following drawings in which:

Fig. 1 is a view taken in substantial medial cross-section of the film drive and rewinding mechanism of the present invention.

Fig. 2 is a bottom plan view with parts broken away of essential parts of the mechanism shown in Fig. 1;

Fig. 3 is a view of the mechanism shown in Fig. 2 taken in cross-section along the broken line 3—3 of Fig. 2;

Fig. 4 is a view of the same taken in cross-section in the plane of the broken line 4—4 of Fig. 2;

Fig. 5 is another view of the same taken in cross-section along the broken line 5—5 of Fig. 2;

Figs. 6, 7 and 8 are similar views, showing the parts, however, in the three different positions they assume, of the relation between the winding (takeup) and rewinding drives of the film magazine and the main driving element therefor; and Fig. 9 is a view of mechanism used for controlling the movement of the said winding (takeup) and rewinding drives to selectively move the same to the three positions shown in Figs. 6, 7 and 8.

Referring now more in detail to the drawings and having reference first to Fig. 1 thereof, the projection machine of the present invention comprises a machine framework generally designated as F, a film containing magazine generally designated as M movably mountable in the machine, an operating mechanism generally designated as O for feeding, winding and rewinding the film in the magazine M, and an optical projection system generally designated as P for projecting and thereby reproducing the record on the film in the magazine.

The film magazine M and its operated parts may now be first described, this by reference to Figs. 2 to 5 of the drawings. This film magazine comprises a casing conveniently made in the two mating parts 10 and 12 secured together in any desired way, which may be given the configuration best shown in Figs. 2 and 3 of the drawings, the rear wall 14 being provided with a central orifice or opening 16 for admitting a beam of projected light and the front wall 18, arcuately formed, being open fully across its front as at 20. The magazine casing sections house a supply of film 22 having a supply (and rewinding) spool and a takeup or winding spool mounted on and rotated by the spool spindles 24 and 26 respectively, the latter suitably journaled respectively in the flanged sleeves 28 and 30, which sleeves are mounted in what may be considered as the top wall 32 of the magazine.

The spindles 24 and 26 are each mounted for axial movement in the spools themselves and in journaling sleeves 28 and 30; and each of these spool spindles, for convenience hereinafter referred to as the spools, is tapered or cammed at one end and provided with a drive element at the other end. Thus the spool 24 is tapered or cammed at 34 at one end and provided at its other end with a drive element in the form of a drive disc or wheel 36, and the spool 26 is tapered or cammed at one end as at 37 and provided at the other end with a drive disc or wheel 38.

The magazine M is also provided with the means for axially moving the film spools (their spindles) and their drive elements. Such means is made to simply comprise a resilient cam plate generally designated as 40 mounted for reciprocation in the directions indicated by the double arrows 42 (see Fig. 2), the said cam plate being fixed to and reciprocated by a rod 44 which is anchored to the magazine section 12 at one end 46 (Figs. 4 and 5) in a part of the magazine housing and at an intermediate point by means of a bar 48 fixed to the housing section 12. The cam plate 40 has two oppositely directed wings 50 and 52 each formed with a flat and an inclined cam face, the cam wing 50 cooperating with the spool end 34 and the cam wing 52 cooperating with the spool end 37. In the position shown in Fig. 2, the cam wing 52 has engaged the cam end 37 of the spool 26 and has moved this spool axially to the position shown in Fig. 3, while the cam wing 50 is disengaged from the spool end 34 permitting this spool to move to the position shown in Fig. 3 under the influence of gravity (the same positions of the spools being shown in Figs. 4 and 5). When the cam plate 40 is moved by its operating rod 44 to the left (viewing Fig. 2), then, as will be further described hereinafter, the cam wing 52 disengages the spool end 37 while the cam wing 50 engages the spool end 34 with the result that the spool 24 is moved axially to an operative position while the spool 26 is permitted to return axially to an inoperative position under the influence of gravity.

Completing the structure of the magazine per se, there are provided two film guide rolls 54 and 56 journaled in the spaced guide plates 58 and 60, the said guide plates being medially connected by means of a stud 62 to a circular boss 64 formed at the inner end of the reciprocating rod 44. The stud 62 is movable in the aperture 63 formed in the magazine section 12 and is limited in its movement in opposite directions by the wall of this aperture. The plates 58 and 60 may be anchored by means of the pin 66 at one end of said plates to the magazine sections 10 and 12, whereby the plates and the guide rolls may pivot about this pin. Engaging the stud 62 is a double loop spring 70 anchored medially opposite the stud 62 to the bar 48. By means of this construction the film guide rolls 54 and 56 are urged under the influence of the spring 70 to the right and into the position as veiwed in Fig. 2. Also, by the same means, the rod 44 and the resilient cam plate 40 are moved to the right and to the position viewed in Fig. 2.

The supply of film 22 thus comprises a film f mounted on the supply spool 24 guided over the guide rolls 54 and 56, the other end of which is attached to the takeup or winding spool 26. The film in and the operated parts on the magazine M normally assume the position shown in Fig. 2; and during a projection and film winding operation the parts assume the same position and the film is fed in the magazine, being taken off the supply spool and wound on the takeup spool, all as shown by the various film associated arrows shown in Fig. 2 of the drawings.

The inventive features in this film magazine M are being separately claimed in my copending application Serial No. 536,345, filed May 19, 1944, now Patent No. 2,384,637, dated September 11, 1945.

The optical projection system P as shown in Fig. 1 comprises a source of illumination 72 in the form of a lamp fitted to a socket (not shown) mounted in a bracket 74 on the frame F, a condensing system 76 fitted in a bracket 78 of the frame, arranged on one side of the magazine M, and a transparent medium 94 (which, as will be described below, comprises the film driving or feeding element), a reflector 82 fixedly arranged adjacent the main shaft 84 of the machine, a projection lens 83 fitted in an aperture in said main shaft, and an adjustable reflector 86 mounted in the frame F, all arranged on the opposite side of the magazine M. By means of this projection system, light is projected through the opening 16 in the magazine, is incident upon the film portion in the line of projection, is then transmitted through the medium 94 and then projected by the lens 83 and reflected by means of the reflectors 82 and 86 to a selenium cell unit (not shown) by means of which the light is converted to electrical sound impulses.

The film drive and rewinding mechanism O shown in assembly in Fig. 1 functions to feed or drive the film f in the magazine and wind the film on the takeup spool thereof during a projection run, and to rewind the film on the supply spool after a projection run. This mechanism O comprises in its essential parts a driving element in the form of a circular drive plate 88 to which is coaxially fixed by means of the flanged disc 90 and the securing elements 92, the film driving member 94 in the form of a drum and more particularly in the form of a transparent annulus. The drive plate 88 and the annular drum 94 are rotatable by means of the ball bearing 96 about a shaft 98 fixed to a central post 100 secured to a suitable part 102 of the machine frame F. This drive plate and annular drum are adapted to be continuously rotated in the operation of the machine; and to this end the drive plate 88 is provided with a peripheral flange 104 which may be driven by a friction wheel 106 fixed to the shaft of or connected to the machine motor 108.

The film magazine M has three different operative phases. During a projection run, the film in the magazine is driven or fed by the annular drum 94 and is wound on the takeup spool 26. After a projection run the film in the magazine is rewound on the supply spool 24. For both of these operative phases the drive plate 88 is rotated in one direction and the rotation maintained. The third operative phase is a static one during which the film in the magazine is neither wound nor rewound, and during such phase the drive plate 88 is also continued in its unidirectional rotation. It is to accomplish these three operative phases of the magazine that the magazine is provided with the spool drives 36 and 38 and the means for operating the same comprising the cam plate 40 and the operating rod 44.

For operating the cam plate 40 through its operating rod 44, there is provided a cam 110 mounted on a stepped part of the central shaft 84 and arranged concentrically or coaxially with the drive plate 88 and the transparent annulus 94. In the organized machine of the present invention, this cam plate is fixed in position while the magazine is moved into and out of projection position. Since in the present application the magazine has been assumed to be stationary or fixed, this cam 110 is shown rotatable about the shaft 84 and for convenience a manual means 112 connected to the cam and movable arcuately in the frame part 114, the inner end 116 of which is fixed to the cam 110, is provided for rotating this cam into any one of the three positions shown in Fig. 9 of the drawings and indicated as $a$, $b$ and $c$. The cam 110 is provided with peripheral cam faces consisting of a deep groove 118 for the position $a$, a shallow groove 120 for the position $c$, and a peripheral face 122 for any intermediate position such as the position $b$. The action of the cam 110 is translated by means of a reciprocal cam follower 124 into the movement of the rod 44, the inner flanged end of the cam follower 124 engaging the circular disc end 64 of the operating rod 44 (as most clearly shown in Fig. 2 of the drawings).

The main drive plate 88 is formed circumferentially near its periphery with an annular depression 126 arranged with reference to the magazine spool drive wheels 36 and 38 so that when the drive wheel 36 is moved to engage the adjacent face 125 of the driving plate 88 as shown in Fig. 7, the engagement will be on one side of the axis of the spool 24, whereas when the drive wheel 38 is moved to engage the adjacent face 127 of the driving plate 88, the engagement will be on the other side of the axis of the spool 26 as shown in Fig. 6 of the drawings. Thereby the continued rotation of the driving plate 88 in one direction will serve to effect the winding of the magazine film (by virtue of the engagement therewith of the spool drive wheel 38 as shown in Fig. 6), and will serve to effect the rewinding of the film (by virtue of the engagement with the driving plate of the spool drive wheel 36 as shown in Fig. 7 of the drawings). It will be noted that the face 125 is elevated with respect to the face 127. Thereby and because of the width of the depression 126, each wheel 36 and 38 will be engaged on only one side of its axis (see Figs. 6 and 7). In Fig. 8 of the drawings both of the spool drive wheels 36 and 38 are disengaged from the driving plate 88, and thereby the driving plate may continue its uninterrupted rotation in the said direction without either winding or rewinding the film in the magazine. As will be further described below, the position assumed by the parts in Fig. 6 corresponds to the $a$ position of Fig. 9, the position assumed by the parts in Fig. 7 corresponds to the $b$ position of Fig. 9, and the position assumed by the parts in Fig. 8 corresponds to the $c$ position of Fig. 9.

The film $f$ in the magazine is fed or driven by the engagement of the central guided strip of the film with the periphery of the transparent annulus or drum 94. Under the conditions as shown particularly in Figs. 1 to 5 of the drawings, the film $f$, influenced by the action of the spring 70, is moved into engagement with the constantly rotating transparent drum 94 and is thereby fed through the optical projection system. At this time the cam follower 124 (which is also acted upon by the spring 70 by way of the rod end 64) is located in the deep groove 118 of the cam 110. In this operative condition the spring cam plate 40 is in the position shown in Figs. 1 to 5 of the drawings, the wing 52 thereof having engaged and moved the spool 26 into a position where its drive wheel 38 has contacted or engaged the driving plate 88. Thus in this operative position shown collectively in Figs. 1 to 6 of the drawings, the film is being fed or driven by the transparent annulus and is being taken up or wound on the takeup spool 26. It will be noted that when the drive disc 38 is moved into engagement with the driving plate 88, the rewinding drive disc 36 is at the same time moved out of engagement with the driving plate, this being due to the position assumed by the cam plate wing 50 and by the then freedom of axial movement of the spool 24. As aforesaid, the light beam of the optical system is projected through the magazine and the moving film, thence through the rotating transparent annulus, and is thence reflected to the selenium or other light sensitive cell.

For a rewinding operation the cam 110 is moved to the $b$ position, the peripheral face 112 of the cam then engaging and moving the cam follower 124 radially outwardly. This causes the rod 44 and all the parts associated therewith to move outwardly radially thereby causing the disengagement of the guided portion of the film $f$ from the driving drum 94 and simultaneously causing the spring cam plate 40 to move to its other extreme position. The transparent drum 94 may, therefore, continue its rotation without driving or feeding the film in the magazine and the cam wing 50 now being moved into engagement with the spool end 34 while the wing 52 is moved out of engagement with the spool end 37, the drive wheels 36 and 38 will be moved outwardly and inwardly respectively causing these wheels finally to assume the position shown in Fig. 7 of the drawings, in which position the takeup wheel is free and the supply or rewinding wheel is rotated for rewinding the film. It will be noted that both drive wheels 36 and 38 are arranged at substantial radii from the axis of rotation of the system (represented by the post 100), and it will be also noted that the rewinding wheel is substantially smaller in diameter than the winding or takeup wheel. Thereby both the winding and rewinding spools are rotated at the desired speeds, with the rewinding effected in a short interval of time.

When it is desired to discontinue either the winding or rewinding of the film as when it is contemplated to change the magazine or film supply (or when a new magazine is moved into position in the organized machine) without, however, stopping the motor or the rotation of the operating mechanism O, the cam 110 is moved to its c position (Fig. 9) in which position the cam follower 124 moves into the shallow cam face 120. In this intermediate position the guided portion of the film f is still out of contact with the peripheral face of the transparent (glass) drum 94 and the spool drive wheels 36 and 38 both assume the disengaged positions shown in Fig. 8 of the drawings.

The use and operation of the film drive and rewinding mechanism of my present invention will in the main be fully apparent from the above detailed description thereof and all of the advantages resulting therefrom will also be manifest. It will be noted particularly that the many functions of the machine are accomplished by exceedingly simple mechanism. The main drive simply consists of a light weight circular plate which may be directly motor driven and the film is fed by a drum which not only forms part of the optical system of the machine but which acts as a fly wheel for the driving plate. The connections between the film spools (their drives) and the driving plate are exceedingly simple both structurally and operationally. All of the parts present a compact and efficiently organized arrangement so that the main purpose of the invention is achieved. All of the parts are readily accessible thereby permitting ready assembly and disassembly for repair.

It will be obvious that while I have described the invention in a preferred form, that many changes may be made without departing from the spirit of the invention defined in the following claims.

I claim:

1. In a projection machine, a film magazine comprising a casing for housing a film to be projected provided with a takeup spool drive and a rewinding spool drive, a driving element, means for rotating the driving element in one direction for both the winding and rewinding of the film, means for causing the takeup spool drive and said rotating driving element to engage for the winding of the film in the magazine, and separate means for causing the rewinding spool drive and said rotating driving element to engage for the rewinding of the film in the magazine, both of said means being effective to move said spool drives axially, said drives being movable to disengaged position when not effectively acted upon by said means.

2. In the projection machine of claim 1, mechanism for operating both of said means to selectively produce the takeup drive engagement and the rewinding drive engagement.

3. The projection machine of claim 2, in which said mechanism for operating both of said means comprises a cam selectively active upon the respective means for causing said takeup and rewinding spool drives to engage with said driving element.

4. In a projection machine, a film magazine comprising a casing for housing a film to be projected provided with a takeup spool drive and a rewinding spool drive, a driving element, means for rotating the driving element in one direction for both the winding and rewinding of the film, means for causing the takeup spool drive and said rotating driving element to engage for winding the film in the magazine during a projection, separate means for causing the rewinding spool drive and said rotating driving element to engage for rewinding the film in the magazine after a projection, both of said means being effective to move said spool drives axially, said drives being movable to disengaged position when not effectively acted upon by said means, thereby stopping such winding or rewinding, and mechanism for operating both of said means to selectively produce any one of the following three operations: takeup drive engagement with rewinding drive disengagement, disengagement of both takeup drive and rewinding drives, and takeup drive disengagement with rewinding drive engagement.

5. The projection machine of claim 4, in which said mechanism comprises a member having a pair of cam faces each active upon one of said means for causing said takeup and rewinding spool drives to engage with said driving element.

6. In a projection machine, a film magazine comprising a casing for housing a film to be projected provided with a takeup spool drive and a rewinding spool drive, a driving element, means for rotating the driving element in one direction for both the winding and rewinding of the film, means for moving the takeup spool drive into engagement with said rotating driving element for winding the film in the magazine during a projection without moving the rewinding spool drive, and separate means for moving the rewinding spool drive into engagement with said rotating driving element for rewinding the film in the magazine after a projection without moving the takeup spool drive, each of said drives being movable independently of the other to disengaged position when not effectively acted upon by said means, thereby stopping such winding or rewinding.

7. In the projection machine of claim 6, mechanism for operating both of said means to selectively produce any one of the following three operations: takeup drive engagement with rewinding drive disengagement, disengagement of both takeup and rewinding drives, and takeup drive disengagement with rewinding drive engagement.

8. The projection machine of claim 7, in which said mechanism for operating both of said means comprises a cam having a pair of cam faces each active upon one of said means for moving said takeup and rewinding spool drives into engagement with said rotating driving element.

9. In a projection machine, a film magazine comprising a casing for housing a film to be projected provided with a takeup spool drive wheel and a rewinding spool drive wheel, a rotatable driving plate, means for rotating said driving plate in one direction for both the winding and rewinding of the film, means for moving the takeup drive wheel into engagement with said rotating driving plate for the winding of film in the magazine without moving the rewinding spool drive wheel, and separate means for moving the rewinding drive wheel into engagement with the rotating drive plate for the rewinding of the film in the magazine without moving the takeup spool drive wheel, each of said drive wheels being movable independently of the other to disengaged position when not effectively acted upon by said means, thereby stopping such winding or rewinding.

10. The apparatus as in claim 9 in which the engagement between the driving plate and the takeup drive wheel is on one side of the axis of such wheel, while the engagement between the driving plate and the rewinding drive wheel is on the other side of the axis of such latter wheel.

11. In a projection machine, a film magazine comprising a casing for housing film to be projected provided with a takeup spool drive wheel and a rewinding spool drive wheel, a rotatable driving plate, means for rotating said driving plate in one direction for both the winding and rewinding of the film, means for moving the takeup drive wheel into engagement with said rotating driving plate for the winding of the film in the magazine without moving the rewinding spool drive wheel, sperate means for moving the rewinding drive wheel into engagement with the rotating drive plate for the rewinding of the film in the magazine without moving the takeup spool drive wheel, each of said drive wheels being movable independently of the other to disengaged position when not effectively acted upon by said means, thereby stopping such winding or rewinding, and mechanism for operating both of said means for selectively moving or permitting the drive wheels to move into position for winding the film, into neutral positions, and into position for rewinding the film.

12. In a projection machine, a film magazine comprising a casing for housing a film to be projected provided with a takeup spool drive disc and a rewinding spool drive disc, a rotatable driving plate, means for rotating said driving plate, means for moving the takeup drive disc into frictional engagement with said rotating driving plate for the winding of the film in the magazine, and separate means for moving the rewinding drive disc into frictional engagement with the rotating drive plate for the rewinding of the film in the magazine, both of said means being effective to move said spool drives axially, said drives being movable to disengaged position when not effectively acted upon by said means.

13. The apparatus of claim 12 in which the drive discs are both located at one side of and at substantial radii from the axis of rotation of the driving plate, and in which the rewinding drive disc is substantially smaller in diameter than the takeup drive disc.

14. In a projection machine, a film magazine comprising a casing for housing a film to be projected provided with a takeup spool drive and a rewinding spool drive, a rotatable driving plate, a film drive member carried by said driving plate engageable peripherally by the film in the magazine, means for causing the takeup spool drive and said rotating driving plate to engage for the winding of the film in the magazine, and means for causing the rewinding spool drive and said rotating driving plate to engage for the rewinding of the film in the magazine, said drives being movable to disengaged position when not effectively acted upon by said means.

15. The apparatus of claim 14 in which the film drive member comprises a circular member fixed concentrically to said driving plate.

16. In a projection machine, a rotatable driving plate, a film engaging driving member, fixed to said plate and a cam member, all arranged concentrically about the axis of rotation of the driving plate, a film magazine arranged on one side of said axis and provided with a takeup spool drive and a rewinding spool drive, and mechanism operated by said cam member for causing either the takeup spool drive or the rewinding spool drive to engage said rotating driving plate for the winding or rewinding of the film in the magazine, said drives being movable to disengaged position when not effectively acted upon by said cam member.

17. The apparatus of claim 16 in which the driving plate is a circular plate and the film engaging driving member is a circular drum.

18. In the apparatus of claim 16, a device for causing the film in the magazine to engage and disengage the film driving member, said device being connected to said mechanism for causing film engagement during a winding operation and film disengagement during a rewinding operation.

19. The apparatus of claim 16 in which said mechanism includes a reciprocable cam plate movable between a position where it causes the takeup spool drive to engage the driving plate and a position where it causes the rewinding spool drive to engage the driving plate.

20. The apparatus of claim 16 in which said mechanism includes a reciprocable cam plate movable to two extreme positions and an intermediate position, the cam plate in one extreme position causing the takeup spool drive to engage the driving plate, in the other extreme position causing the rewinding spool drive to engage the driving plate and in the intermediate position permitting both spool drives to disengage from the driving plate.

21. In a projection machine, a film magazine comprising a casing for housing a film to be projected, provided with a takeup spool drive disc and a rewinding spool drive disc, a rotatable driving plate, means for rotating said driving plate, means for moving the takeup drive disc into frictional engagement with said rotating driving plate for the winding of the film in the magazine, and means for moving the rewinding drive disc into frictional engagement with the rotating driving plate for the rewinding of film in the magazine, said drive discs both being located at one side of and at substantial radii from the axis of rotation of said driving plate, the rewinding drive disc being substantially smaller in diameter than the takeup drive disc, said drive discs being movable to disengaged position when not effectively acted upon by said means.

22. In a projection machine, a film magazine comprising a casing for housing a film to be projected provided with a takeup spool drive wheel and a rewinding spool drive wheel, a rotatable driving plate, means for rotating said driving plate in one direction for both the winding and rewinding of the film, means for moving the takeup drive wheel into engagement with said rotating driving plate for the winding of film in the magazine, and means for moving the rewinding drive wheel into engagement with the rotating driving plate for the rewinding of film in the magazine, the engagement between the driving plate and the takeup drive wheel being on one side of the axis of said wheel, while the engagement between the driving plate and the rewinding drive wheel is on the other side of the axis of said latter wheel, said drive wheels being movable to disengaged position when not effectively acted upon by said means.

23. In a projection machine, a film magazine comprising a casing for housing a film to be projected, provided with a takeup spool drive wheel and a rewinding spool drive wheel, a rotatable driving plate overlying said drive wheels, means for rotating said driving plate in one direction for both the winding and rewinding of the film, means for moving said takeup drive wheel axially into engagement with said rotating driving plate for the winding of film in the magazine, and means for moving the rewinding drive wheel axially into engagement with the rotating driving plate for the rewinding of film in the magazine, said drive wheels being movable to disengaged position when not effectively acted upon by said means.

24. In a projection machine, a film magazine comprising a casing for housing a film to be projected, provided with a takeup spool drive wheel and a rewinding spool drive wheel, a rotatable driving plate overlying said drive wheels, means for rotating said driving plate in one direction for both the winding and rewinding of the film, means for moving the takeup drive wheel axially into engagement with said rotating driving plate for the winding of film in the magazine, means for moving the rewinding drive wheel axially into engagement with the rotating driving plate for the rewinding of film in the magazine, said drive wheels being movable to disengaged position when not effectively acted upon by said means, and mechanism for operating both of said means for selectively moving the drive wheels and permitting said drive wheels to move axially into position for winding the film, into neutral positions, and into position for rewinding the film.

25. In a projection machine, a film magazine comprising a casing for housing a film to be projected provided with a takeup spool drive wheel and a rewinding spool drive wheel, a main driving plate for winding and rewinding the film in the magazine and overlying said drive wheels, and a film drive member carried by said main driving plate and rotatable therewith engageable peripherally by the film in the magazine, so as to drive said film.

26. The apparatus of claim 25, in which the film drive member is fixed concentrically to said driving plate.

27. The apparatus of claim 25 in which the driving plate is circular and in which the film drive member comprises an annulus fixed concentrically to the driving plate.

28. In a projection machine, a film magazine provided with takeup and rewinding spool drives, a main driving plate selectively engageable with said drives for winding and rewinding the film in the magazine, and a film drive member carried by said main driving plate and rotatable therewith engageable peripherally by the film in the magazine so as to drive said film.

29. The apparatus of claim 28, in which the film drive member is fixed concentrically to said driving plate.

FREEMAN H. OWENS.

REFERENCES CITED

The following references are of record in the file of this patent:

UNITED STATES PATENTS

| Number | Name | Date |
|---|---|---|
| 1,372,675 | Davis | Mar. 29, 1921 |
| 1,452,101 | Williams | Apr. 17, 1923 |
| 1,614,214 | Steiner | Jan. 11, 1927 |
| 1,618,117 | Tschopp | Feb. 15, 1927 |
| 1,760,219 | Thornton | May, 27, 1930 |
| 1,815,693 | DeMadaler | July 21, 1931 |
| 1,886,856 | Warwick | Nov. 8, 1932 |
| 1,933,807 | Hopkins | Nov. 7, 1933 |
| 2,029,730 | Mallina | Feb. 4, 1936 |
| 2,069,595 | Thomas | Feb. 2, 1937 |
| 2,109,627 | Finch | Mar. 1, 1938 |
| 2,196,730 | Hooker | Apr. 9, 1940 |
| 2,196,738 | Nagel | Apr. 9, 1940 |
| 2,266,755 | Herzig | Dec. 23, 1941 |
| 2,318,118 | Warner et al. | May 4, 1943 |
| 2,362,019 | Moore | Nov. 7, 1944 |

FOREIGN PATENTS

| Number | Country | Date |
|---|---|---|
| 466,446 | Great Britain | May 28, 1937 |